United States Patent
Testin et al.

(10) Patent No.: US 9,515,471 B2
(45) Date of Patent: Dec. 6, 2016

(54) PLUG AND SOCKET PURE GAS INSULATED WALL BUSHING FOR HVDC AND UHV

(75) Inventors: Giovanni Testin, Milan (IT); Luca Crocco, Castiraga Vidardo Lodi (IT); Milorad Sehovac, Milan (IT)

(73) Assignee: ALSTOM TECHNOLOGY LTD., Baden (CH)

( * ) Notice: Subject to any disclaimer, the term of this patent is extended or adjusted under 35 U.S.C. 154(b) by 0 days.

(21) Appl. No.: 14/371,068

(22) PCT Filed: Jan. 9, 2012

(86) PCT No.: PCT/EP2012/050265
§ 371 (c)(1),
(2), (4) Date: Jul. 8, 2014

(87) PCT Pub. No.: WO2013/104412
PCT Pub. Date: Jul. 18, 2013

(65) Prior Publication Data
US 2015/0027775 A1    Jan. 29, 2015

(51) Int. Cl.
| | | |
|---|---|---|
| H02G 3/22 | (2006.01) | |
| H01B 17/26 | (2006.01) | |
| H02G 5/06 | (2006.01) | |
| H01B 17/30 | (2006.01) | |
| H02B 13/035 | (2006.01) | |
| H02G 5/00 | (2006.01) | |

(52) U.S. Cl.
CPC .............. H02G 3/22 (2013.01); H01B 17/26 (2013.01); H01B 17/30 (2013.01); H02G 5/061 (2013.01); H02B 13/0358 (2013.01); H02G 5/002 (2013.01)

(58) Field of Classification Search
USPC .............. 439/668, 817, 827, 248, 252, 840; 174/21 C, 143, 88 R, 137 B, 668
See application file for complete search history.

(56) References Cited

U.S. PATENT DOCUMENTS

| | | | | |
|---|---|---|---|---|
| 3,767,840 A | * | 10/1973 | Cronin et al. ................ | 174/73.1 |
| 3,931,451 A | * | 1/1976 | Durschner et al. ......... | 174/11 R |
| 3,982,806 A | * | 9/1976 | Wilson et al. ............... | 439/248 |
| 4,038,486 A | * | 7/1977 | Meyer et al. .................. | 174/28 |
| 4,111,511 A | * | 9/1978 | Bolin ............................ | 439/252 |
| 4,280,015 A | * | 7/1981 | Czech et al. ................... | 174/28 |
| 4,424,402 A | * | 1/1984 | Murase ....................... | 174/15.3 |
| 4,523,052 A | * | 6/1985 | Takahashi et al. .......... | 174/15.3 |
| 4,550,219 A | * | 10/1985 | Bolin et al. ................. | 174/21 C |
| 4,721,829 A | * | 1/1988 | Meyer et al. .............. | 174/21 JS |

(Continued)

OTHER PUBLICATIONS

Hsp Hochspannungsgeraete Gmbh: "HVDC Wall Bushing Type GSEW/GSEWt—Mounting, Operating and Maintenance Instructions", Aug. 23, 2011, pp. 1-20, Camp-Spich-Strasse 18, Troisdorf, Germany.

(Continued)

*Primary Examiner* — Alexander Gilman
(74) *Attorney, Agent, or Firm* — Pearne & Gordon LLP (57) ABSTRACT

The invention relates to the domains of power electronics and electric power transmission systems and concerns a new structure for wall bushings for High and Ultra High Voltage AC or DC applications. The wall bushing is remarkable as it can be assembled as a kit of two replaceable modules: a plug type module (20) and a socket type module (30) whose central conductors (15a,15b) are connected by a joint that allows their thermal expansion.

10 Claims, 4 Drawing Sheets

(56) References Cited

U.S. PATENT DOCUMENTS

| | | | |
|---|---|---|---|
| 5,170,885 A * | 12/1992 | Guenther et al. | 218/134 |
| 5,466,891 A * | 11/1995 | Freeman et al. | 174/142 |
| 5,548,081 A * | 8/1996 | Rost | 174/14 BH |
| 5,571,990 A * | 11/1996 | Pham et al. | 174/24 |
| 5,654,526 A * | 8/1997 | Sharp | 174/84 R |
| 5,689,088 A * | 11/1997 | Rokunohe et al. | 174/21 C |
| 5,811,734 A * | 9/1998 | Ponsioen | 174/99 B |
| 6,419,512 B2 * | 7/2002 | Starck | 439/278 |
| 6,433,271 B1 * | 8/2002 | Arnborg | 174/16.2 |
| 6,621,030 B2 * | 9/2003 | Andou et al. | 218/43 |
| 6,951,987 B1 * | 10/2005 | Hansen et al. | 174/142 |
| 7,875,803 B2 * | 1/2011 | Sjoberg et al. | 174/152 R |
| 7,914,351 B2 * | 3/2011 | Balsells et al. | 439/840 |
| 7,994,427 B2 * | 8/2011 | Berglund et al. | 174/142 |
| 8,134,089 B2 * | 3/2012 | Roseen et al. | 174/668 |
| 8,226,428 B2 * | 7/2012 | Arnaud et al. | 439/252 |
| 8,445,777 B2 * | 5/2013 | Matuszak et al. | 174/21 C |
| 8,471,150 B2 * | 6/2013 | Emilsson et al. | 174/143 |
| 8,637,773 B2 * | 1/2014 | Jonsson et al. | 174/137 B |
| 8,847,077 B2 * | 9/2014 | Emilsson | 174/152 R |
| 8,859,899 B2 * | 10/2014 | Skrypka et al. | 174/88 R |
| 2007/0042648 A1 * | 2/2007 | Balsells | 439/817 |
| 2010/0018752 A1 * | 1/2010 | Emilsson et al. | 174/144 |
| 2010/0029145 A1 * | 2/2010 | Balsells et al. | 439/827 |

OTHER PUBLICATIONS

Pfister et al.: "A new seperable 170 kV outdoor bushing system creates a multi-purpose transformer or switchgear", Jul. 19, 2006, pp. 1-4, Winterbach, Germany.

ABB Components ED—ABB Components: "Gas insulated wall bushing, type GGFL, Installation and maintenance guide", vol. 2770 501-8 en, no, Rev. 3, Nov. 30, 2010, pp. 1-13.

International Search Report for PCT/EP2012/050265 dated Aug. 13, 2012.

International Preliminary Report on Patentability for PCT/EP2012/050265 dated Mar. 20, 2013.

* cited by examiner

PLUG AND SOCKET PURE GAS INSULATED WALL BUSHING FOR HVDC AND UHV

TECHNICAL DOMAIN AND PRIOR ART

This invention relates to the domains of power electronics and electric power transmission systems and in particular to wall bushings for High and Ultra High AC or DC Voltage applications.

Figure 1:
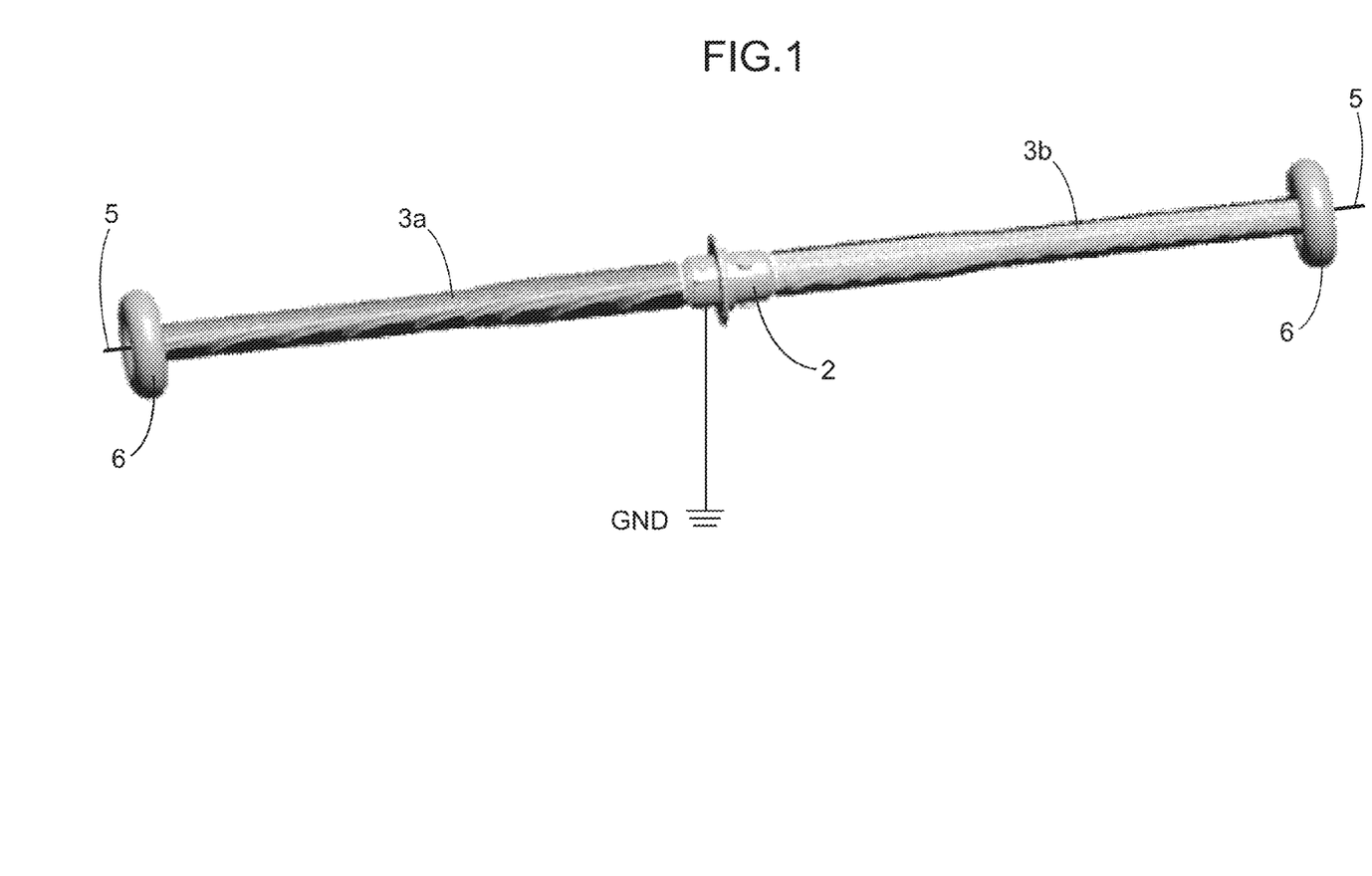
FIG. 1 schematically illustrates the general constitution of a prior art wall bushing.

FIG. 1 schematically illustrates the general constitution of a wall bushing.

A wall bushing 1 is used to connect the indoor semiconductors converters or other indoor electrical equipment to outdoor equipment both in AC and DC yards.

A bushing 1 comprises an axial central conductor for leading the current through a wall. The conductor is made from aluminum or copper. The bushing 1 further comprises a central flange 2 which is fixed to the wall and must therefore be at ground potential GND. A first 3a section and a second 3b section extend axially from the end faces of the central flange and consist of two insulating pipes surrounding the central conductor and provided with silicon rubber sheds at their outer surface. Each section 3a, 3b consists of a glass fiber reinforced epoxy or porcelain tube and it is ended by a suitable flange that seals it and supports one extremity of the central conductor. Moreover, each flange carries a connecting terminal 5 that protrudes outside the section for the electrical connection of the bushing to a high voltage device, i.e. a cable or converters. Both ends of the bushing are generally provided with corona shields 6 surrounding the flanges and the connecting terminals to avoid partial discharges in air.

The section 3a, located within the walls, is called inner section, the other section 3b, located outside the walls, is called outer section.

The bushing 1 keeps the axial conductor electrically isolated from the metallic housing equipment or the building walls when operating at several thousand or even hundreds of thousands of volts. To achieve this purpose, high voltage bushings rely on sophisticated insulation systems able to keep a several kV conductor operating safely at only a few centimeters away from the grounded flange 2.

Conventional insulation systems are composed of dry type and gas type bushings.

The major technology used for HV dry type bushings is RIP (standing for Resin-Impregnated Paper).

This design involves special paper wrapped around the conductor as well as metallic foils placed at strategic locations within this wrap. To achieve its required high dielectric strength, no air or gas bubbles must be trapped among the successive layers of paper. Therefore, the cylinder of wound paper and foil is thoroughly impregnated with a special resin material. The two major disadvantages of this technology are: the difficulty of construction and the relevant mass of the finished assembly.

The main technology used for HV gas type bushings is called pure gas. The main insulation consists of compressed SF6 (sulphur hexafluoride) gas. The two purposes of the compressed SF6 gas are: to insulate the conductor from ground potential and to improve the cooling of the central conductor. The capability to perform the above mentioned actions is related to the gas density. For operation, the bushing is filled with gas at a pressure higher or equal than 4 bars gauge at 20° C. The gas is introduced through a valve located in the central flange 2.

The pure gas technology allows the best performance/weight ratio compared to the dry type one.

It is to be noted that, a combination of dry type and gas type technologies is often used: it is called RIP-SF6. The advantages and the limits of this technology are well-known to the person skilled in the art.

Wall bushings for High and Ultra High AC or DC Voltage (like the 600 kV, the 820 kV or the 1100 kV) applications are components that are extremely long (for example ranging from 10 m to 30 m) and particularly heavy.

Consequently, shipping and assembly (or dismantling) of those components, but also of smaller bushings, require complex machinery and transportation systems. In addition, there is a risk of internal damages during the transportation that cannot be easily detected by inspection and in case of damage, repair is difficult.

Therefore it is admitted that a 20 m length is a limit beyond which transportation costs and complexity of the assembly are quite prohibitive. Thus, for bushings designed for voltages of more than 500 kV DC or 400 kV AC, engineers are nowadays facing unsolved transportation, assembly and maintenance problems.

The relative low mass of a bushing based on pure gas technology allows to manage the above aspects in a partially easier way. However, this would not be sufficient to solve all the above-mentioned problems.

Therefore, the object of the present invention is to find a new wall bushing structure, based on the pure gas technology, that solves the above-mentioned problems related to a long length structure.

PRESENTATION OF THE INVENTION

The invention concerns a High voltage AC or DC wall bushing made in pure gas technology that is constituted by two modules, designed as a plug module and a socket module.

The plug type module forms one section of a high voltage AC or DC wall bushing made in pure gas technology, said plug type module comprising an insulating tube that is axially extended at a first end thereof by an internal tubular section of a central flange part arranged at a first end of the plug type module, said insulating tube and said central flange part, surrounding a central cylindrical conductor, said conductor axially extends along the plug type module, the plug type module having at its second end a flange that seals it and that supports the central conductor, said plug type module being designed to be electrically plugged into a socket type module that forms the other section of a high voltage AC or DC wall bushing made in pure gas technology by reversibly sealing the central flange part of said plug type module with a central flange part of the socket type module and by removably connecting the central conductor of said plug type module to a central conductor of the socket type module.

In a preferred embodiment of the present invention, the central flange part of the plug type module comprises at least one support insulator connecting the internal tubular section of the central flange part of said plug type module to a sliding bush that surrounds the central conductor, said central conductor axially extending outside said plug type module at the first end thereof, wherein the extremity of said central conductor has a diameter decreasing towards its end.

Preferably, the extremity of the central conductor presents a non-uniform decreasing diameter and comprises a conductive portion and a conductive guiding pin that has a diameter less than that of the conductive portion. Advantageously, the guiding pin is at least partially covered on its cylindrical surface by a low friction sleeve in order to facilitate its plugging-in.

The central flange part of the plug type module can comprise fastening means adapted to fix said plug type module on a wall.

The socket type module forms a second section of a high voltage AC or DC wall bushing made in pure gas technology, said socket type module comprising an insulating tube that is axially extended at a first end thereof by an internal tubular section of a central flange part arranged at a first end of the socket type module, said central flange part, said insulating tube and said central flange part of the socket type module surrounding a central cylindrical conductor that axially extends along the socket type module, the socket type module having at its second end a flange that seals it and that supports the central conductor, the socket type module being designed to receive a plug type module forming an outer section of a high voltage AC or DC wall bushing made in pure gas technology by reversibly sealing the central flange part of the plug type module with the central flange part of said socket type module and by removably connecting the central conductor of said socket type module to the central conductor of the plug type module.

In a preferred embodiment of the present invention, the length of the central conductor of the socket type module is less than that of the socket type module, the extremity of the central conductor located at the first end of the socket type module being provided with a hollow connective shield that axially extends outside the socket type module, said connective shield comprising a bore having an increasing diameter towards the free extremity of the connective shield so as to form a socket for receiving an adapted extremity of the central conductor of the plug type module and to allow an electrical contact between the central conductor of the plug type and the central conductor of said socket type module.

Preferably, the internal section of the connective shield presents a first, a second, and a third portions, the internal diameter of said third portion being approximately equal to the diameter of the guiding pin of the central conductor of the plug type module, the internal diameter of said second portion being approximately equal to the diameter of the conductive portion of the central conductor of the plug type module and, the central conductor having a constant main diameter over most of its length, the internal diameter of said first portion being approximately equal to said main diameter.

The central flange part of the socket type module can comprise fastening means adapted to fix said socket type module on a wall.

The present invention also relates to a high voltage AC or DC wall bushing made in pure gas technology comprising the socket type module and the plug type module, the first end of the plug type module and the first end of the socket type module being in contact, the central flange of the wall bushing being formed by the reversibly sealing of the central flange part of the plug type module and the central flange part of the socket module, the central conductor of the wall bushing being formed by the central conductor of the plug module and the central conductor of the socket module that are electrically connected at the first end of each module, said flange of each module carrying a connecting terminal that extrudes from the module for connecting said bushing to high voltage devices, said central flange comprising means for filling the wall bushing with high pressurized gas.

BRIEF DESCRIPTION OF THE DRAWINGS

This invention will be better understood after reading the following description of example embodiments given purely for guidance and that are in no way limitative, with reference to the appended figures, wherein.

Identical, similar or equivalent parts of the different figures are marked with the same numbers so as to facilitate comparisons between the different figures.

The different parts shown in the figures are not necessarily drawn at the same scale, to make the figures more easily understandable.

DETAILED PRESENTATION OF PARTICULAR EMBODIMENTS

The concept behind the invention is to conceive a wall bushing that can be manufactured as an assembly made up of two different functional modules: a plug type module and a socket type module.

Therefore, transportation and assembly of a high voltage AC or DC wall bushing based on the pure gas technology is greatly simplified, especially since the pure gas technology allows for lightweight structures.

Consequently, if transport conditions are identified as difficult, each separate module can be shipped in relatively small boxes, and thus, reducing the risks of damage during the transport. In addition this concept allows the transportation of very big units, otherwise impossible.

Figure 2:
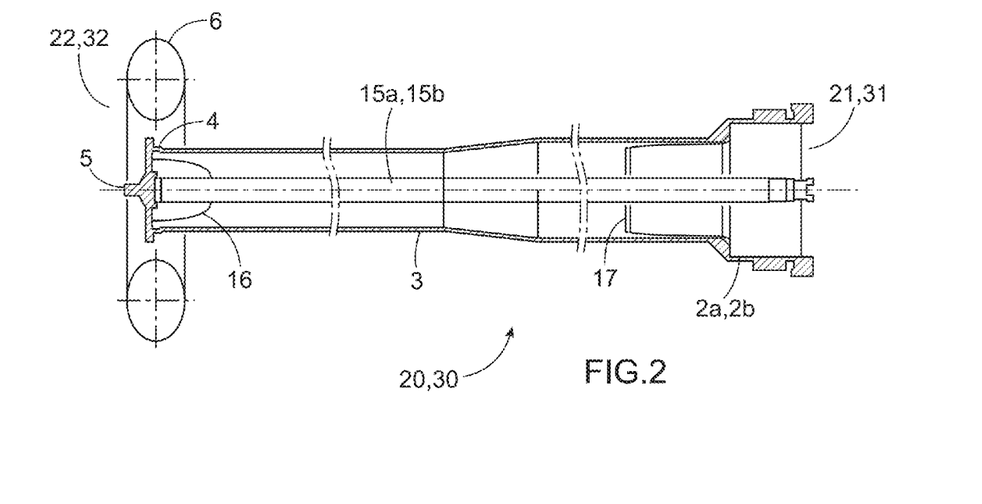
FIG. 2 schematically shows a longitudinal sectional view of the general structure of a module according to the invention.

FIG. 2 shows a longitudinal sectional view of the general structure of a module 20,30 that could either be referred to a plug type module or a socket type module. The specification of each module will be described latter in the description.

Both plug type 20 and socket type 30 modules are based on the pure gas technology. The plug type module 20 forms one of the two sections (outer section for outdoor use or inner section for indoor use) of a high voltage AC or DC wall bushing, whereas the socket type module 30 forms the corresponding other section (inner section or outer section) of the same bushing.

Each module comprises an insulating tube 3 that is axially extended at a first end thereof by an internal tubular section of a central flange part 2a,2b arranged at a first end of the module 21,31. The insulating tube 3 is made from an insulating material featuring high mechanical, electrical, thermal and resistant qualities. For example, the insulating tube can be made from a glass fiber reinforced epoxy tube with silicon rubber sheds extruding on its outer surface or made from a traditional porcelain insulator.

The central flange part 2a,2b of the module is made from a conductive material such as aluminum. The central flange part 2a of the plug type module 20 is designed to be reversibly sealed with the central flange part 2b of the socket type module 30.

The insulating tube 3 and the central flange part 2a,2b of each module surround a central cylindrical conductor 15a, 15b having a main diameter. The central cylindrical conductor 15a,15b is made from aluminum or copper and axially extends along the module 20,30.

Each module 20,30 has at its second end 22,32 a flange 4 that seals the module, supports an extremity of the central conductor 15a,15b keeping it in the center of the insulating tube. The flange 4 also supports a terminal connection 5 that protrudes outside the module and connects the central conductor 15a,15b to the AC or DC devices of a power plant. Indeed, the arrangement is designed for allowing electrical current to pass from the terminal connection 5 through the flange 4 and into the central conductor 15a,15b.

A ring shaped shield 6 is preferably mounted at the second extremity of each module 22,32 in order to minimize partial discharges and ionization in air.

In a preferred embodiment, the respective connections of the insulating tube 3 to the central flange part 2a,2b and the flange 4 are of cast or machined aluminum and are fastened with screws and nuts and provided with seals such as O-ring gaskets.

Preferably, a plurality of inner hollow shields 16,17 are mounted into each module 20,30. A first inner shield 16 is mounted at the flange 4 and a second inner shield 17 is mounted at the central flange part 2a,2b. These inner shields 16,17 are preferably made from aluminum or other conductive material and they locally control the electric field. This improves the performances of the insulating tube 3 from the central conductor 15a,15b.

The shape of these inner shields 16,17 is optimized to reduce the surface electric field on the insulating tube 3 and also in order to minimize the charge accumulation on its surface. Therefore, each shield 16,17 has a paraboloid shape whose section decreases towards the center of the insulating tube 3.

The simple construction of each module 20,30 and the limited number of parts used in both modules significantly reduce the production costs.

The separation of the wall bushing into two modules 20,30 also allows to inspect and test each module before being assembled. Therefore, the risk to assemble defective parts is significantly reduced.

The features of each module 20,30 will be described in connection with FIGS. 3 to 6.

Figure 3:
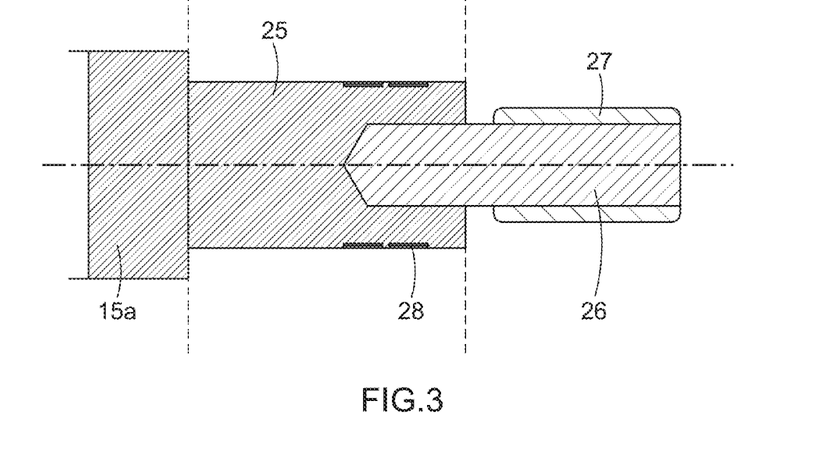
FIG. 3 shows the extremity of the central conductor of the plug type module at the first end thereof in a preferred embodiment of the invention.

FIG. 3 shows the extremity of the central conductor of the plug type module at the first end thereof in a preferred embodiment of the invention.

The first end 21 of the plug type module 20, is designed to removably receive a socket type module 30, by reversibly sealing the central flange part 2a of the plug type module 20 to the central flange part 2b of the socket type module 30 and by electrically connecting the central conductor 15a of the plug type module 20 to the central conductor 15b of the socket type module 30.

To this end, a preferred embodiment of the invention consists in that the central conductor 15a axially extends outside the plug type module 20 at the first end 21 thereof. The central conductor 15a has a constant main diameter along the module except at the first end 21 thereof, where the extremity of the central conductor 15a has a diameter decreasing towards its end.

Indeed, the extremity of the central conductor 15a presents a non-uniform decreasing diameter and comprises a conductive portion 25 and a metallic guiding pin 26 that has a diameter lower than the diameter of the conductive portion 25.

The conductive portion 25 is equipped with at least one circumferential spring contact 28.

In the example illustrated on FIG. 3, the guiding pin 26 is a part that is screwed into the conductive portion 25. However, the guiding pin 26 and the conductive portion 25 can be made up of one piece. Alternatively, the guiding pin 26 can be welded into the conductive portion 25.

Preferably, the guiding pin 26 is at least partially covered on its cylindrical surface by a low friction plastic sleeve 27 in order to facilitate its plugging into the socket while connecting the central conductor 15a of the plug type module 20 to the central conductor 15b of a socket type module 30. The sleeve 27 can be made from a polymeric material such as PET or PTFE.

Such a plug module 20 also comprises supporting means for ensuring insulation and mechanical support of the central conductor 15a at the first end 21 of the module (the central conductor being supported by the flange 4 at the second end of the module). These supporting means comprise at least one support insulator that connects the internal tubular section of the central flange part 2a of the plug type module 20 to a sliding bush that surrounds the central conductor 15a. The sliding bush allows the axial movements due to thermal expansion of the central conductor 15a.

Figure 4:
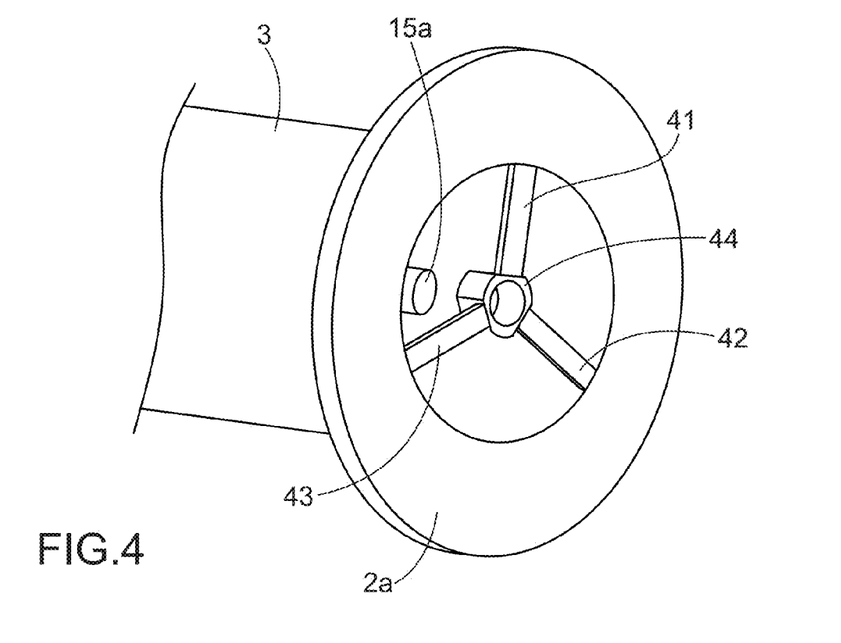
FIG. 4 shows the structure of the support insulators in the preferred embodiment of the invention.

The description of these supporting means will be made in relation to FIG. 4, which illustrates their structure in the preferred embodiment of the invention. The extremity of the central conductor 15a is not shown in order to facilitate the understanding of this figure.

In this embodiment, the supporting means comprise three support insulators 41,42,43 evenly distributed (3 pcs displaced 120°) around the central conductor 15a they support. Each support insulator 41,42,43 is fixed at one of its ends to the internal surface of the central flange part 2a of the plug type module 20, while the other end is not directly fixed to the central conductor 15a, but is fixed on a metallic sliding bush 44 that is coaxial with the central conductor 15a. The metallic sliding bush 44 is electrically connected to the central conductor 15a by suitable sliding or flexible electrical contacts.

Therefore, when the central conductor 15a expands due to thermal effect, it can freely move inside the bush 44 without the risk of bending of the central conductor 15a or transferring of mechanical forces to the support insulators 41,42, 43.

Preferably, the metallic sliding bush 44 is electrically shielded to minimize the effect of the electric field intensity on the support insulators 41,42,43.

Advantageously, the support insulators 41,42,43 are made from epoxy resin with mineral insulating components and their shape is optimized to reduce the surface electric field in order to minimize the charge accumulation on the support insulators surface.

Figure 5:
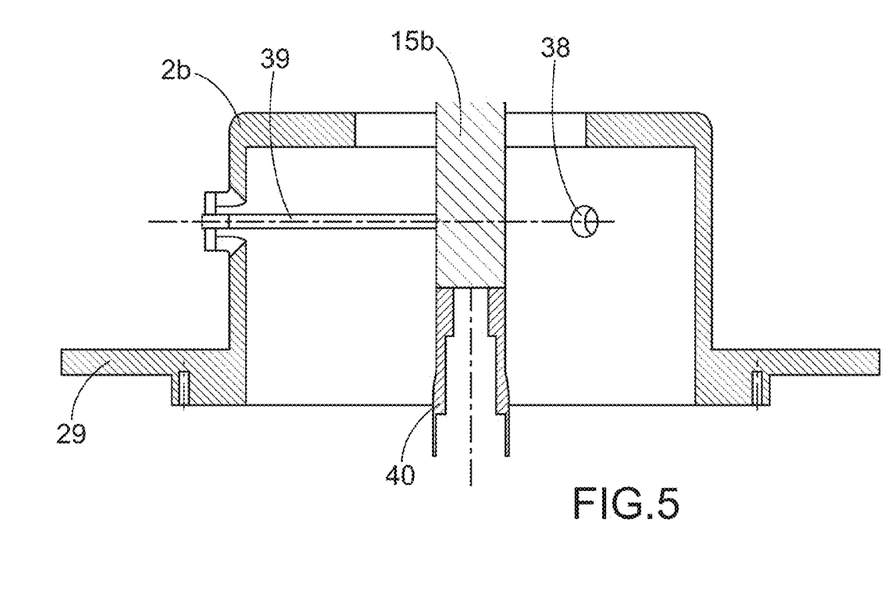
FIG. 5 shows the central flange part of the socket type module in the preferred embodiment of the invention.

FIG. 5 shows the central flange part of the socket type module and focuses on the extremity of the central conductor of the socket type module at the first end thereof.

In this figure the socket type module 30 is designed to form an inner section of a high voltage AC or DC wall bushing. Therefore, the arrangement of the central flange part 2b of the socket type module 30, comprises fastening means to fix the module on a wall.

In the example shown in FIG. 5, these fastening means are represented by a fastening plate 29 welded to the central flange part. This plate is designed to be mounted, for example, with screws alongside the wall.

According to the invention, the central flange part on which the fastening means are provided could be either the central flange part 2a of the plug type module 20 or the central flange part 2b of the socket type module 30.

The central flange 2b part of the socket type module is also provided with a plurality of drilled holes 38 to allow the insertion of the removable supports 39 to serve as mechanical supports for the central conductor at the first end 31 of the socket type module, being the central conductor 15b supported by the flange 4 at the second end 32 of the module, during assembly or transportation phases of the socket type module 30.

These holes 38 are through holes which are drilled on the surface of the central flange part and through its thickness.

Indeed, during these phases, the central conductor 15b has to be maintained by these provisional removable supports 39, made for example from plastic, in order to prevent it from moving and thus, avoid damaging the module.

The first end 31 of the socket type module 30, is designed to removably receive a plug type module 20, by reversibly sealing the central flange part 2b of the socket type module 30 to the central flange part 2a of the plug type module 20 and by electrically connecting the central conductor 15b of the socket type module 30 to the central conductor 15a of the plug type module 20.

To this end, the length of the central conductor 15b of the socket type module 30 is less than that of the socket type module 30.

Preferably, the conductor 15b has a constant diameter along the socket type module and this diameter is equal to the main diameter of the central conductor 15a of a plug type module.

As the central conductor 15b is supported by the flange 4 at the second end 32 of the socket type module 30, the free extremity of the central conductor 15b located at said first end 31 of the socket type module 30 is provided with a hollow connective shield 40 that axially extends the central conductor 15b outside the socket type module 30. The connective shield 40 comprises a bore that has an increasing diameter towards the free extremity of the shield so as to form a socket for receiving an adapted extremity of the central conductor 15a of a plug type module 20 and therefore allowing an electrical contact between the central conductor 15a of the plug type module 20 and the central conductor 15b of the socket type module 30.

Indeed, in the preferred embodiment of the invention, the bore presents a non-uniform increasing diameter. Therefore, the bore is realized in such a way that the connective shield 40 has an internal section that presents three different portions, each having a different diameter and thus, the shield 40 is designed to receive the non-uniform decreasing diameter of the central conductor 15a of the plug type module 20 as above described.

When the free end of the central conductor 15a of the plug type module 20 is inserted into the connective shield 40, an electrical contact occurs between the free end of the guiding pin 26 and the free end of the central conductor 15b of the socket type module.

An electrical and mechanical connective joint is then formed. This joint or seal is designed to ensure compensation of the thermal expansion of the two sections of the conductor. Indeed, the at least one circumferential spring contact 28 located on the conductive portion 25 allows to compensate any thermal expansion of both conductors 15a, 15b when they are joined.

Figure 6:
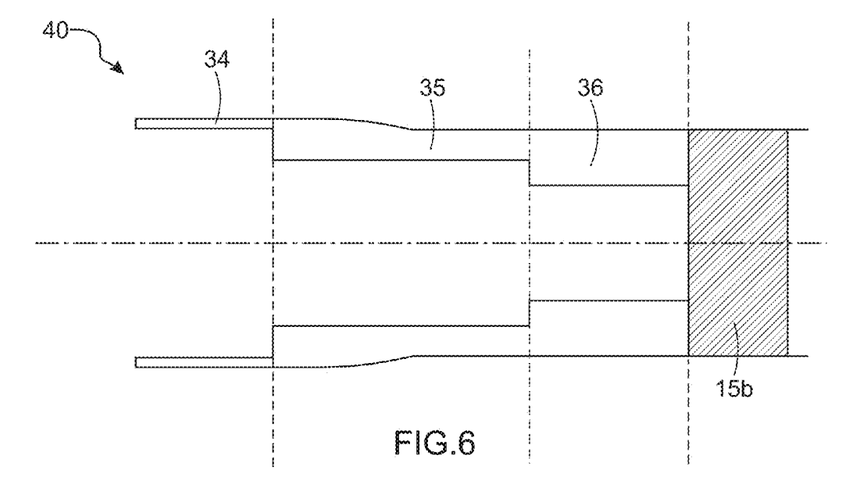
FIG. 6 shows the extremity of the central conductor of the socket type module and the different portions constituting the connecting shield at the first end thereof in a preferred embodiment of the invention.

FIG. 6 illustrates the different portions constituting that connective joint.

The length and the diameter of the third 36, the second 35 and the first 34 portions are chosen in order to respectively receive the guiding pin 26, with the sleeve 27 if it is implemented, the conductive portion 25 and a part of the central conductor 15a of a plug type module. Moreover, these portions are designed to allow the thermal expansion of either the central conductor 15a of the plug type module 20 or the central conductor 15b of the socket type module 30 or both conductors. Therefore, the internal diameter of the third portion 36 is approximately equal to the diameter of the guiding pin 26 of the central conductor 15a of a plug type module 20, the internal diameter of the second portion 35 being approximately equal to the diameter of the conductive portion 25 of a central conductor 15a of a plug type module 20 and the internal diameter of the first portion 34 is approximately equal to the main diameter of a central conductor 15a of the plug type module 20.

By the term approximately equal, it is understood that the diameters of the first 34, the second 35 and the third 36 portions are chosen slightly greater than those of the main conductor 15a, the conductive portion 25 and the guiding pin 26, respectively, so as to provide a slight clearance to compensate the thermal expansion of the conductors 15a, 15b as above explained.

The assembly of the two modules will now be described in relation to FIGS. 2 and 7.

Figure 7:
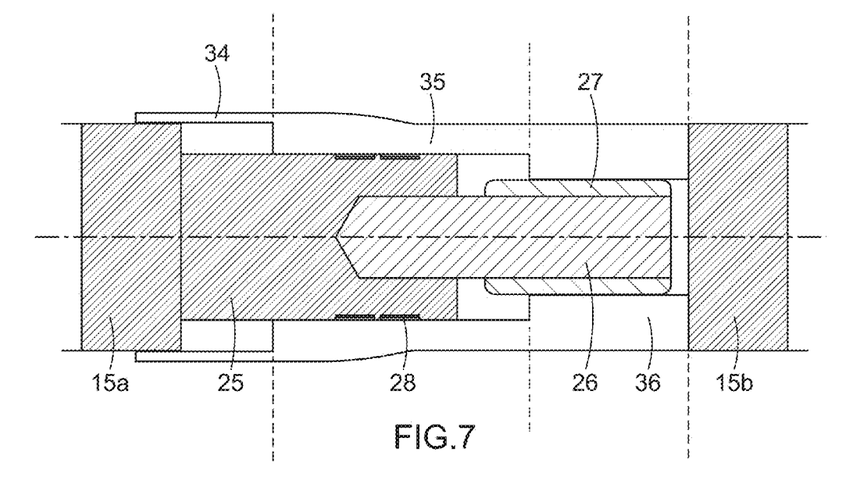
FIG. 7 shows the joint formed between the two central conductors when the plug type module and the socket type module are assembled.

FIG. 7 shows the connective joint formed between the two central conductors 15a,15b when the plug type module 20 and the socket type 30 module are assembled. In this figure, the extremity of the conductor 15a of the plug type module is partially inserted into the extremity of the conductor 15b of the socket type module 30.

The assembly of the plug type module and the socket type module results in a high voltage AC or DC wall bushing made in pure gas technology.

If the two modules have reasonable size and mass, it is possible to assemble both modules 20,30 directly on the wall. In this case, the section provided with the fastening plate 29 (that normally also the inner section) is the part that will be installed first on the wall.

The first end 21 of the plug type module and the first end 31 of the socket type module are plugged together and an electrical joint is formed between the two central conductors 15a,15b.

More precisely, the central flange part 2a of the plug type module and the central flange part 2b of the socket module are fastened together while a perfect joint between the central conductors 15a, 15b is performed through the insertion of the guiding pin 26 into the third portion 36. The resulting central flange of the wall bushing is designed to be electrically connected to the ground and fastened to the wall through the fastening plate 29. The two central flange parts 2a,2b are fastened together by screws and nuts and sealing between both parts is provided by seals such as O-rings to ensure gas tightness. Consequently, the two central flange parts are sealed reversibly since through such simple means of fastening, it is possible to separate the two modules again.

Thus, it is possible to easily replace a damaged module with a new module of the same type. This presents a double advantage: On the one hand, it is possible to replace a module without having to change the entire wall bushing. On the other hand, the change requires less labor or specialized equipment as the dimensions of the handled module are reduced and its dismantling can be done directly from the wall.

Therefore, the outer section of the wall bushing, which is exposed to changing weather conditions can be easily replaced without having to change the entire wall bushing. Moreover, the conception of the wall bushing into two modules allows to unplug the two modules for inspecting the shields 16,17,40 and the circular joint between the central conductor 15a of the plug type module and the sliding bush. Thus, a damaged piece can be easily replaced on site with a significant saving in time and costs.

After the assembly of the plug type module and the socket type module, the removable supports 39 are removed and the drilling holes 38 will be closed by suitable flanges provided by sealing gaskets.

The gas filling means and the gas control equipment are installed on the central flange, normally on the outer section in order to be easily accessible when the bushing is de-energized and grounded.

The invention claimed is:

1. Plug type module (20) forming one section of a high voltage AC or DC wall bushing made in pure gas technology, said plug type module comprising an insulating tube (3) that is axially extended at a first end thereof by an internal tubular section of a central flange part (2a) arranged at a first end (21) of the plug type module, said insulating tube (3) and said central flange part (2a) surrounding a central cylindrical conductor (15a), said conductor axially extends along the plug type module and has an extremity at said first end (21) of said plug type module, wherein said central flange part (2a) of the plug type module comprises at least one support insulator (41, 42, 43) connecting the internal tubular section of the central flange part (2a) of said plug type module to a sliding bush (44) that surrounds the central conductor (15a), said central conductor axially extending outside said plug type module at the first end thereof, wherein the extremity of said central conductor has a diameter decreasing towards its end, the plug type module having at its second end (22) a flange (4) that seals it and that supports the central conductor, said plug type module being designed to be electrically plugged on operation site into a socket type module (30) that forms the other section of a high voltage AC or DC wall bushing made in pure gas technology by reversibly sealing the central flange part (2a) of said plug type module with a central flange part (2b) of the socket type module and by removably connecting said extremity of the central conductor (15a) of said plug type module to a central conductor (15b) of the socket type module, in this way the plug and socket modules can be transported as separate parts to be assembled on site.

2. Plug type module according to claim 1, wherein the extremity of the central conductor (15a) presents a non-uniform decreasing diameter and comprises a conductive portion (25) and a conductive guiding pin (26) that has a diameter less than that of the conductive portion.

3. Plug type module according to claim 2, wherein the conductive portion (25) is equipped with at least one circumferential spring contact (28).

4. Plug type module according to claim 2, wherein the guiding pin (26) is at least partially covered on its cylindrical surface by a low friction sleeve (27) in order to facilitate its plugging-in.

5. Plug type module according to claim 1, wherein said central flange part (2a) comprises fastening means (29) adapted to fix said plug type module on a wall.

6. Socket type module (30) forming a second section of a high voltage AC or DC wall bushing made in pure gas technology, said socket type module comprising an insulating tube (3) that is axially extended at a first end thereof by an internal tubular section of a central flange part (2b) arranged at a first end (31) of the socket type module, said central flange part (2b), said insulating tube and said central flange part (2b) of the socket type module surrounding a central cylindrical conductor (15b) that axially extends along the socket type module and has an extremity at said first end (31) of said socket type module, the socket type module having at its second end (32) a flange (4) that seals it and that supports the central conductor (15b), the socket type module being designed to receive on operation site a plug type module (20) forming an outer section of a high voltage AC or DC wall bushing made in pure gas technology by reversibly sealing the central flange part (2a) of the plug type module with the central flange part (2b) of said socket type module and by removably connecting said extremity of the central conductor (15b) of said socket type module to said extremity of the central conductor (15a) of the plug type module, in this way the plug and socket modules can be transported as separate parts to be assembled on site, wherein the length of the central conductor (15b) of the socket type module is less than that of the socket type module, the extremity of the central conductor located at the first end (31) of the socket type module being provided with a hollow connective shield (40) that axially extends outside the socket type module, said connective shield (40) comprising a bore having an increasing diameter towards the free extremity of the connective shield so as to form a socket for receiving an adapted extremity of the central conductor (15a) of the plug type module (20) and to allow an electrical contact between the central conductor of the plug type (20) and the central conductor of said socket type module.

7. Socket type module according to claim 6, wherein the internal section of the connective shield (40) presents a first (34), a second (35), and a third (36) portions, the internal diameter of said third portion (36) being approximately equal to the diameter of the guiding pin (26) of the central conductor of the plug type module, the internal diameter of said second portion (35) being approximately equal to the diameter of the conductive portion (25) of the central conductor of the plug type module and, the central conductor (15a) having a constant main diameter over most of its length, the internal diameter of said first portion (34) being approximately equal to said main diameter.

8. Socket type module according to claim 6, wherein said central flange part (2b) comprises fastening means (29) adapted to fix said socket type module on a wall.

9. Socket type module according to claim 6, wherein said central flange part (2b) comprises a plurality of drilled holes (38) to allow the insertion of removable supports (39) to serve as mechanical supports for the central conductor (15b) at the first end (31) of the socket type module.

10. High voltage AC or DC wall bushing made in pure gas technology comprising the socket type module according to claim 6, the wall bushing further comprising:
 a plug type module (20) forming one section of the high voltage AC or DC wall bushing made in pure gas technology, said plug type module comprising an insulating tube (3) that is axially extended at a first end thereof by an internal tubular section of a central flange part (2a) arranged at a first end (21) of the plug type module, said insulating tube (3) and said central flange part (2a) surrounding a central cylindrical conductor (15a), said conductor axially extends along the plug type module and has an extremity at said first end (21) of said plug type module, wherein said central flange part (2a) of the plug type module comprises at least one support insulator (41, 42, 43) connecting the internal tubular section of the central flange part (2a) of said plug type module to a sliding bush (44) that surrounds the central conductor (15a), said central conductor axially extending outside said plug type module at the first end thereof, wherein the extremity of said central conductor has a diameter decreasing towards its end, the plug type module having at its second end (22) a flange (4) that seals it and that supports the central conductor, said plug type module being designed to be electrically plugged on operation site into a socket type module (30) that forms the other section of a high voltage AC or DC wall bushing made in pure gas technology by reversibly sealing the central flange part (2a) of said plug type module with a central flange part (2b) of the socket type module and by removably connecting said extremity of the central conductor (15a) of said plug type module to a central conductor (15b) of the socket type module, in this way the plug and socket modules can be transported as separate parts to be assembled on site, wherein the first end (21) of the plug type module and the first end (31) of the socket type module are in contact, the central flange of the wall bushing is formed by the reversibly sealing of the central flange part (2a) of the plug type module and the central flange part (2b) of the socket module, the central conductor of the wall bushing is formed by the central conductor (15a) of the plug module and the central conductor (15b) of the socket module that are electrically connected at the first end of each module, said flange (4) of each module carries a connecting terminal (5) that extrudes from the module for connecting said bushing to high voltage devices, and said central flange comprises means for filling the wall bushing with high pressurized gas.

* * * * *